US007109612B2

(12) United States Patent
Vasilescu et al.

(10) Patent No.: US 7,109,612 B2
(45) Date of Patent: Sep. 19, 2006

(54) VENTILATING DEVICE FOR ELECTRICAL MACHINE IN PARTICULAR FOR MOTOR VEHICLE

(75) Inventors: Claudiu Vasilescu, Paris (FR); Ruyi Fang, Paris (FR); David Huart, Stuttgart (DE); Guillaume Tromeur, Paris (FR)

(73) Assignee: Valeo Equipments Electriques Moteur, Creteil (FR)

( * ) Notice: Subject to any disclaimer, the term of this patent is extended or adjusted under 35 U.S.C. 154(b) by 0 days.

(21) Appl. No.: 10/239,229

(22) PCT Filed: Feb. 5, 2002

(86) PCT No.: PCT/FR02/00429
§ 371 (c)(1),
(2), (4) Date: Sep. 20, 2002

(87) PCT Pub. No.: WO02/063748
PCT Pub. Date: Aug. 15, 2002

(65) Prior Publication Data
US 2003/0030334 A1 Feb. 13, 2003

(30) Foreign Application Priority Data
Feb. 5, 2001 (FR) .................................. 01 01526

(51) Int. Cl.
*H02K 9/00* (2006.01)
(52) U.S. Cl. .......................................... 310/58; 310/64
(58) Field of Classification Search .................. 310/52, 310/58, 64, 283
See application file for complete search history.

(56) References Cited

U.S. PATENT DOCUMENTS

| 4,584,496 A | 4/1986 | Frister |
| 5,375,637 A | 12/1994 | Matsumoto et al. |
| 6,011,332 A * | 1/2000 | Umeda et al. ................. 310/58 |
| 6,023,112 A * | 2/2000 | Asao ............................ 310/58 |

FOREIGN PATENT DOCUMENTS

| DE | 223585 A1 | 6/1965 |
| DE | 44 30 073 A1 | 2/1996 |
| EP | 0 762 615 A1 | 3/1997 |
| EP | 0 779 697 A1 | 6/1997 |
| JP | A 63-265545 | 11/1968 |
| JP | A 59-178935 | 10/1984 |
| JP | A 6-284638 | 10/1994 |

* cited by examiner

*Primary Examiner*—Darren Schuberg
*Assistant Examiner*—Nguyen Hanh
(74) *Attorney, Agent, or Firm*—Berenato, White & Stavish LLC

(57) ABSTRACT

The invention relates to a ventilation device for an electrical machine including a rotor (42) provided externally with reliefs (46) delimiting between them cooling channels (46) in which a cooling fluid circulates and a stator.

The rotor is equipped with at least one axial fan (48) suitable for directing an airflow into the cooling channels.

The invention can be applied to the ventilation device for a motor-vehicle alternator.

16 Claims, 3 Drawing Sheets

VENTILATING DEVICE FOR ELECTRICAL MACHINE IN PARTICULAR FOR MOTOR VEHICLE

TECHNICAL FIELD OF THE INVENTION

The present invention relates to a ventilation device for a rotating electrical machine, especially for a motor-vehicle alternator, as well as to a machine provided with such a device.

STATE OF THE ART

A rotating electrical machine, of the single-phase or multi-phase type, includes at least two parts arranged in coaxial fashion, namely a rotor and a stator, one constituting an armature and the other an inductor.

The rotor generally carries a fan for cooling the machine, at least at one axial end. This is because at least one of the armature/inductor elements includes a coil which heats up such that it is necessary to cool it for correct operation of the machine. This machine most often carries electronic components as well as ball bearings which it is likewise necessary to cool by the use of a flow of air or, in general, of a cooling fluid, generated by the fan.

When the armature is formed by the rotor, the machine constitutes an electric motor and converts electrical energy into mechanical energy. This machine converts mechanical energy into electrical energy when the armature is formed by the stator so as to operate as an electrical generator and to constitute an alternator, for example. Needless to say, the electrical machine can be reversible in order, for example, to form a motor-vehicle alternator/starter making it possible to start the engine of the vehicle while having an alternator function.

FIG. 1 represents a multi-phase rotating electrical machine in the form of an alternator of three-phase type for a motor vehicle with an internal-combustion engine.

The alternator includes, going from left to right of FIG. 1, that is to say from front to rear, a drive pulley 10 integral with the front end of a shaft 12, the rear end of which carries collector rings (not referenced) belonging to a collector 14. The axis of the shaft 12 constitutes the rotational axis of the machine.

Centrally, the shaft 12 carries, fixedly, the rotor 16 which is equipped with an excitation coil 18, the ends of which are linked by wire links to the collector 14. For further details, refer to the document EP-A-0 515 259.

The rotor 16 here is a claw-type rotor, that is to say a rotor provided externally with reliefs delimiting between them a passage for cooling-fluid flow, and therefore includes two pole wheels 20, 22 front and rear respectively, each respectively carrying a front fan 24 and a rear fan 26.

These fans 24, 26 include a first series of blades or vanes, which between them form ventilation channels. The blades are obtained by cutting-out and folding of a flange fixed, for example by welding or by any other appropriate means such as crimping, onto the pole wheel 20, 22 in question. Each wheel features axial teeth turned towards the other wheel with the teeth of one wheel imbricated with the other so as to form magnetic poles when the coil 18 is activated by virtue of the collector rings of the collector 14 which are each in contact with a brush (not referenced) carried by a brush holder 28 also serving as a support for a voltage regulator (not represented).

The stator 30, for its part, forms the armature of the alternator and surrounds the rotor 16.

It features a body 32 equipped internally with axial notches (not represented) for wires or pins to pass which the coils 34 of the stator 30 include. These coils 34 are provided with buns (not referenced) extending, on the one hand, in projection on either side of the body 32 and, on the other hand, radially above the fans 24, 26.

These fans 24, 26 extend in the vicinity respectively of a front bearing 36 and of a rear bearing 38. The bearings 36, 38 are pierced for internal ventilation of the alternator by way of the fans 24, 26 when the latter are driven in rotation by the pulley 10, which is linked to the engine of the motor vehicle by a transmission device including at least one belt in engagement with the pulley. This ventilation makes it possible to cool the coils 18, 34 as well as the brush holder 28 with its regulator, as well as a rectification device 40 which is associated with it. The path followed by the cooling fluid, in this instance air, has been represented by arrows, through the various apertures of the bearings 36, 38 and within the machine.

By reason of the nature of the fans 24 and 26, which conventionally consist of fans of centrifugal type, the path of the air in the alternator is essentially radial.

The electrical output demanded from the alternator increases greatly with the increase in the number and in the power of the consuming elements fitted on board the motor vehicles. This increase in the electrical demand generates a consequent increase in the temperature of the hottest parts of the alternator such as the diodes of the rectification device 40, the bearings, the rotor, etc.

The ventilation device with which the alternator is provided, although being sufficiently effective to provide the cooling for the various elements of the alternator for relatively moderate electrical demands, is ineffective for greater demands.

This is because, when the requirements in terms of electrical energy increase, the problem of cooling the main elements forming part of the alternator becomes crucial.

Some alternators are provided with water-cooling circuits, mainly equipping the stator.

In this type of alternator, the rectifier is also effectively cooled. However, the rotor, which is devoid of a cooling circuit, can reach very high temperatures.

In order to remedy this drawback, some alternators are provided with two centrifugal fans, arranged on either side, and of different dimensions, such that a pressure gradient appears, generating air circulation in an axial fashion.

However, other than by driving the fans at a speed which would generate unacceptable noise levels, the axial flow is insufficient to cool the rotor sufficiently.

Other electrical machines, such as the one described in U.S. Pat. No. 4,418,295 and in U.S. Pat. No. 4,418,295, are equipped with fans of the axial/centrifugal type, that is to say fans the blades of which include an axial part and a radial part and generate an airflow having an axial component and a radial component.

However, in these types of fans, the axial component is insufficient to cool the whole of the rotor effectively.

Moreover, they do not make use of an optimal positioning of the air-intake vents and require radial vents to be present, which makes them unsuited to additional cooling by water circulation.

Additionally, this type of ventilation device is of a relatively substantial bulk, given that the fan is generally not carried by the rotor, but axially offset from it.

The object of the invention is to remedy the drawbacks of the state of the art.

SUBJECT OF THE INVENTION

The subject of the invention is therefore a ventilation device for a rotating electrical machine including a rotor provided externally with reliefs delimiting between them channels called cooling channels for the circulation of a cooling fluid and a stator, the rotor is equipped with at least one axial fan, fitted with at least one blade, suitable for directing an airflow into the cooling channels, the blade forming an angle of incidence with the direction of the cooling fluid, characterised in that the angle of incidence of at least one blade of at least one of the said fan increases from the base of the blade towards the tip of it.

This ventilation device may also include one or more of the following characteristics, taken in isolation or according to all the technically possible combinations:

the chord of at least one blade of at least one of the said fans increases from the base towards the tip thereof.

the tip of at least one blade of at least one of the said fan is warped in the rotational direction of the fan.

the base of each blade of the fan is parallel to the rotational axis of the rotor.

the plane which passes through the cross-section of the base of each blade of the fan forms an angle with the rotational axis of the rotor lying between 0° and 75°.

it includes two axial fans arranged on either side of the rotor, the angle of the leading edge of the downstream fan, considering the direction of flow of the air along the rotor, being equal to the angle of the trailing edge of the upstream fan.

the fan is equipped with at least one blade arranged facing each cooling channel.

the fan is provided with two blades, for each cooling channel, arranged upstream and downstream respectively.

at least one blades extends in projection within a support plate for the reliefs of the rotor.

the blades of the fan are arranged according to an irregular circumferential distribution.

each blade of at least one of the fans includes a first centrifugal part able to generate a radial airflow and a second axial part, able to generate an axial airflow, the first and second parts extending radially internally and radially externally respectively.

the tips of the blades of at least one of the fans are joined together by a stiffening ring.

the blades of the fan are mounted on a support including a first annular part providing for the fixing of the fan onto the rotor and a second, generally cylindrical, part extending the first part and carrying the blades.

A further subject of invention is a rotating electrical machine, especially a motor-vehicle alternator, comprising, placed in a casing, a rotor driven in rotation by a motor shaft and a stator surrounding the rotor, the rotor and the stator constituting, in one case, an armature and, in the other case, an inductor, and ventilation means able to generate a flow of cooling fluid through the machine, characterised in that the cooling means include a cooling device as defined above, and in that the machine is provided with air intake and exhaust vents extending axially around the cooling means.

Advantageously, the axial vents are situated facing the blades of the ventilation means.

BRIEF DESCRIPTION OF THE DRAWINGS

Other aims, characteristics and advantages of the invention will emerge from the following description, given solely by way of non-limiting example, and given by reference to the attached drawings, in which.

DESCRIPTION OF PREFERRED EMBODIMENTS

Figure 1:
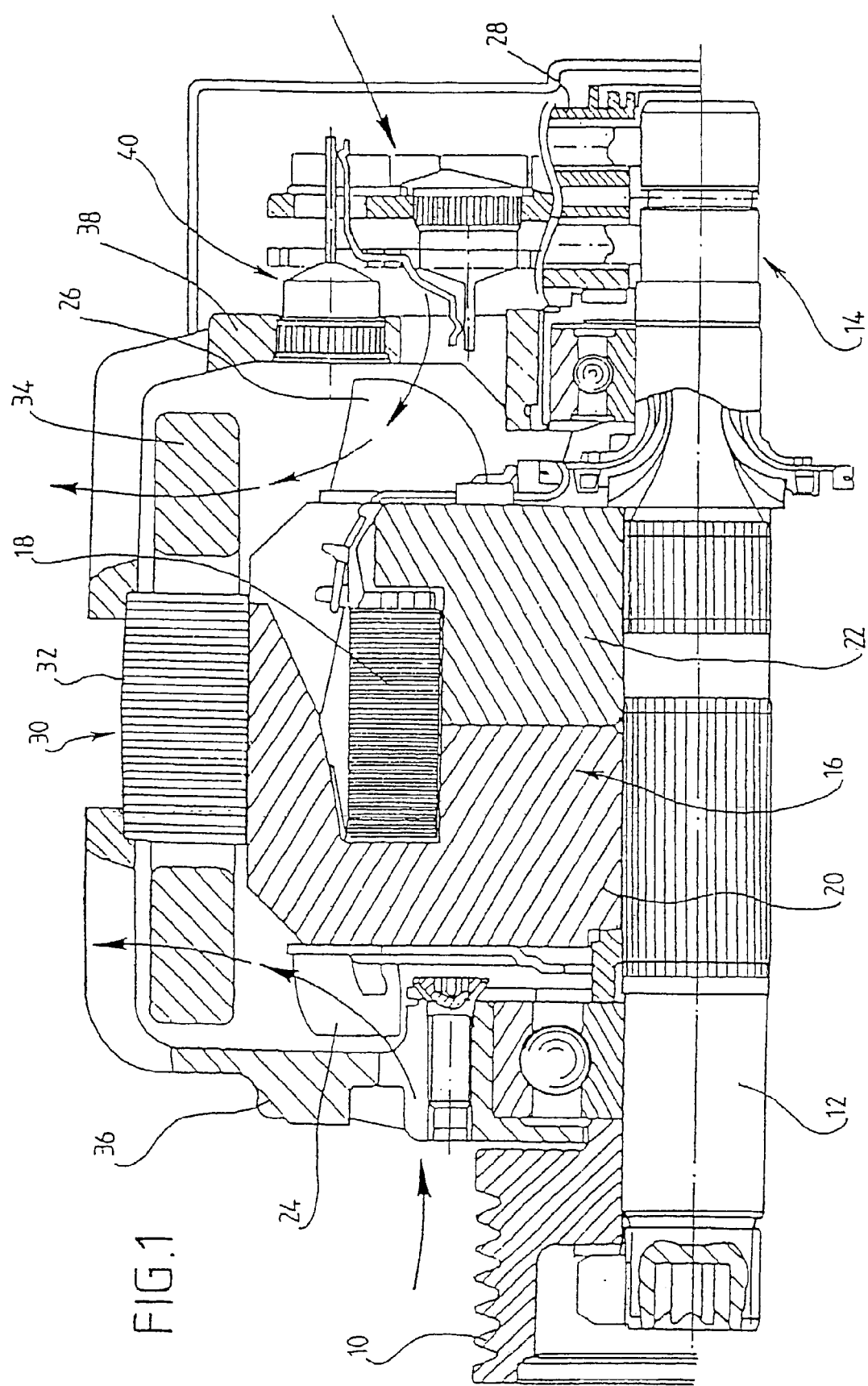
FIG. 1, of which mention has already been made, illustrates an axial half-section of a motor-vehicle alternator provided with a ventilation device in accordance with the state of the art.
Figure 2:
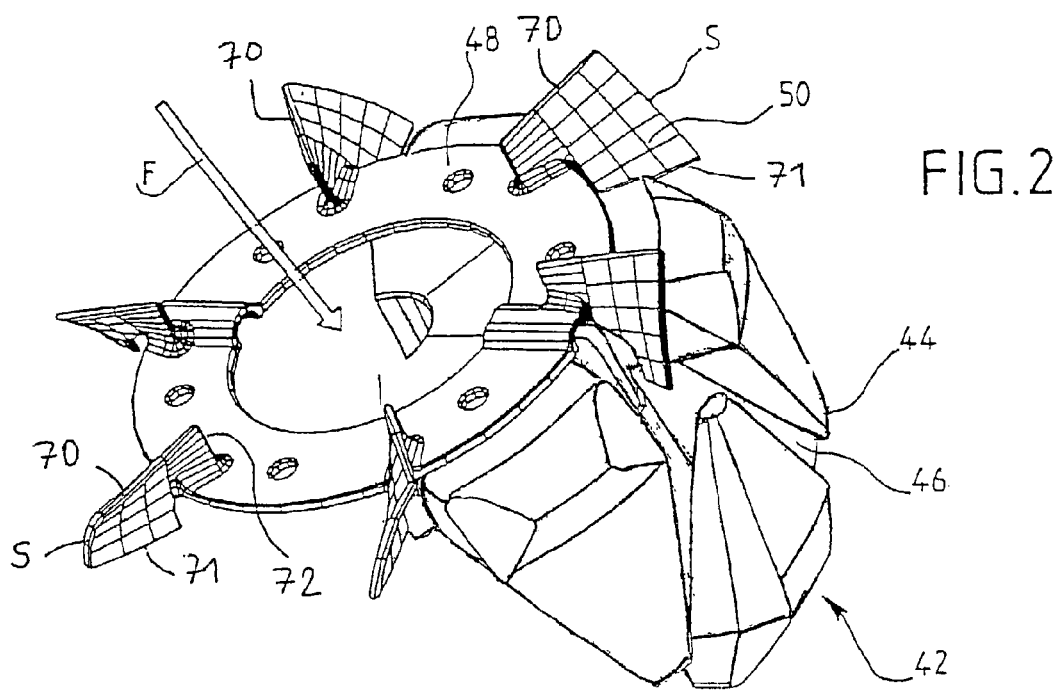
FIG. 2 is a view in perspective of a motor-vehicle alternator rotor provided with a fan of a ventilation device in accordance with the invention.

In FIG. 2 has been represented, in perspective, a rotor of a motor-vehicle alternator provided with a ventilation device in accordance with the invention.

As can be seen in this figure, the rotor, designated by the general numerical reference 42, is provided with reliefs or claws, such as 44, distributed regularly along the periphery of the rotor 42 and delimiting between them the cooling channels, such as 46, in which an airflow circulates, while the rotor 42 is rotating.

In order to generate the airflow, designated by the arrow F in the figures, the rotor 42 is provided with a fan 48, of axial or helical type, fixed onto the rotor in such a way that its blades are situated respectively facing ventilation channels of the rotor, or with two axial fans arranged on either side of the rotor, so as to generate an axial airflow along the channels 46.

For preference, in the embodiment according to which two axial fans are used, the angle of the leading edge 70 of the downstream fan, considering the direction of flow of the air along the rotor 42, is equal to the angle of the trailing edge 71 of the upstream fan. For clarity of the description, the angle of the leading or trailing edge of the blade corresponds to the angle of incidence of the blade in the region of the said edges as defined below.

It will be noted that the fan or fans used to generate the axial airflow may consist of any type of axial fan appropriate for generating such an airflow. For preference, blades will be used which are shaped in such a way that the plane which passes through the cross-section of the base 72 of the blade forms an angle with the rotational axis of the machine lying between 0° and 75°, it being understood that a blade the above-mentioned angle of which is equal to 0° is an axial blade and that a blade the angle of which is equal to 90° is a centrifugal blade.

Hence, the profile of each blade 50 of the fan may be very varied, as may its size or its shape. Likewise, the angle or the angles of attack of the blades may vary on the basis of the requirements or of the performance to be obtained.

It will be noted however that, given that the speed of the fluid increases radially, that is to say towards the tip S of each blade, as can be seen in FIG. 2, the angle of incidence of each blade is increased towards the tip S. This avoids any separation of the fluid streams of the blades 50, due to an incidence of the blade differing from the incidence of the fluid, which would be likely to generate a premature transition to turbulence, an increase in the losses of pressure head, a reduction of the throughput and an increase in noise due to the onset of the separation and to a variation in the aerodynamic load on the blade.

Figure 3:
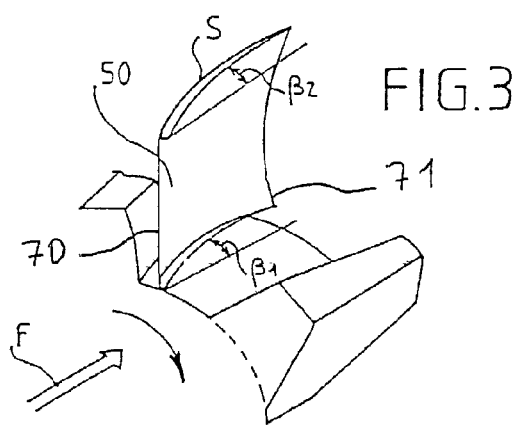
FIG. 3 diagramatically illustrates the construction of a fan blade of FIG. 2.

Thus, by reference to FIG. 3, the angle of incidence β1, at the base of the blade 50, that is to say the angle formed by the blade with respect to the direction of axial aspiration, is less than the angle of attack β2 in the region of the tip S of the blade. It will be noted, however, that these angles of incidence may be equal, as the case may be. However, the angle of incidence of the blade in the region of the base is preferably greater than that of the tip if the base is supported in the region of the outer periphery of the fan. Hence, in all cases, the angle of the blade in the region of the outer part of the base should feature the highest angle of incidence since, as mentioned above, it is at this region that the speed of the fluid is the highest.

In one configuration according to which the blade is carried by two concentric rings, as will be described in what follows by reference to FIG. 6, an inner one, close to the rotational axis of the machine, and an outer one, the blade then including two bases, the base of the blade in the region of which the angle of incidence is smaller is defined as being the part of the base in contact with its support.

Furthermore, in order to avoid any shear in the fluid streams in the region of the trailing edge F of each blade, which would be likely to set up lanes of noisy turbulence, the chord of the blade is increased in the region of the tip S of the latter. Hence the chord of the tip S is greater than the chord of the base 72 of the blade.

Figure 4:
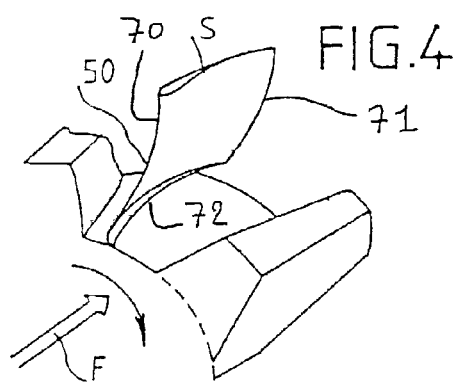
FIG. 4 illustrates another embodiment example of the blade of FIG. 3.

Likewise, according to another exemplary embodiment, which can be combined, if appropriate, with the embodiment of FIG. 3, in order to enhance the discreetness of the fan, the tip of the blade is warped, from the base towards the tip S, so as to achieve a time-domain offset of the noise sources. That is to say, the blade, in this case, takes up a longitudinal curvature, from the base towards its tip, in the direction of rotation of the fan. A warping of the leading edges and of the trailing edges, as well as any combination of the directions of warping of the leading and/or trailing edges can be envisaged, as can be seen in FIG. 4, for example.

Furthermore, the blade may be profiled in the direction of the trailing edge so as to limit the separation of the air at the blade tip and, consequently, the turbulence.

Figure 5:
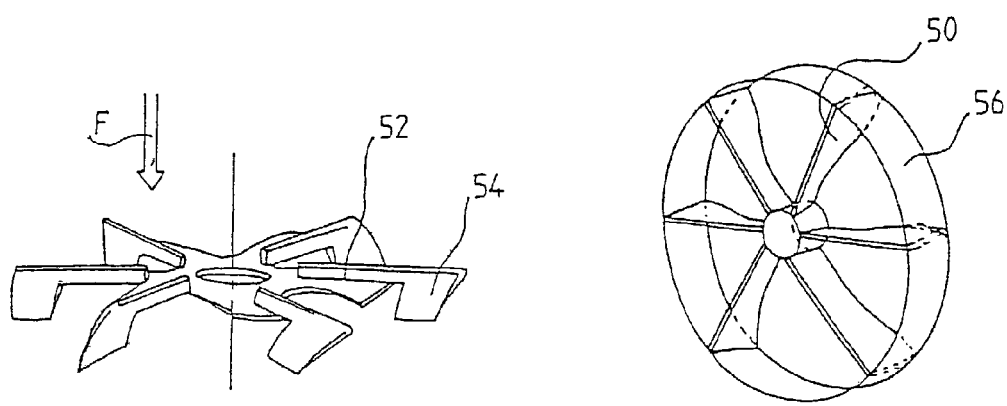
FIG. 5 illustrates another embodiment example of a fan of a ventilation device in accordance with the invention.

It will also be noted that, according to another embodiment, which can be seen in FIG. 5 and which can also be combined with the embodiments described by reference to FIGS. 3 and 4, it is possible to produce the fan 50 in such a way as to fit it with blades of the axial/centrifugal type, that is to say blades including a first, radially inner part 52, consisting of a centrifugal-fan portion, so as to generate an airflow which is radial overall in this region, this first part 52 extending radially outwards via a second part 54 consisting of an axial- or helical-fan portion, which is fed with the radial flow created by the first part 52, intended to be arranged facing cooling channels 46, so as to generate an axial airflow in the latter. As a whole, the blade, thus configured, is suitable for taking up and delivering the cooling fluid in the axial direction.

Figure 6:
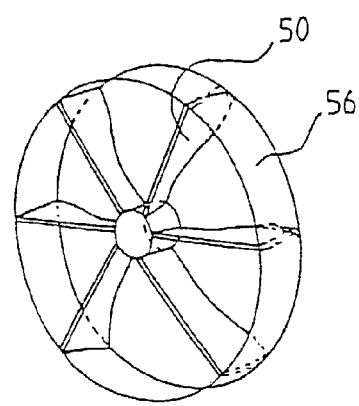
FIG. 6 illustrates another embodiment of a fan of a ventilation device in accordance with invention.

According to another variant, which can be seen in FIG. 6 and which can be combined as appropriate with the embodiments set out above, the fan or fans are provided with a stiffening ring 56 joining the tip of the blades, so as to avoid any twisting or any vibration thereof, thus contributing to enhancing the discreetness of the device, and additionally avoiding stray radial leaks.

In this regard, with the aim of enhancing the discreetness of the device by reducing the operating noise, it is possible to distribute the blades irregularly in the region of the cooling channels, which makes it possible to reduce the noise via a spectral distribution of the frequencies, which implies a distribution of the acoustic power which is preferable to a concentration on a single harmonic.

It will be noted that, in the various embodiments envisaged, the fan is equipped with several blades each arranged facing a respective ventilation channel of the rotor. It is equally possible, in order to reduce the sound level of the device, to equip the fan with blades fewer in number than the number of ventilation channels, in such a way that some of the channels are devoid of a blade, all the possible configurations being conceivable, such as, for example, providing blades every two ducts, or providing the fan with a single blade, depending on the efficiency of the fan. Likewise, it is possible to equip one or more of the ventilation channels with several blades.

It will likewise be noted that, in the various embodiments envisaged above, the fan is suitable for generating an axial airflow along the rotor.

Thus, the casing of the electrical machine equipped with such a fan and provided with air-intake and exhaust vents provided on the mutually opposite sides of the machine so as to allow an effective circulation of air between them and, in particular, opposite the axial faces of the bearings in the vicinity of which the fans are placed. However, particularly in the case of the electrical machines devoid of complementary cooling means by circulation of a cooling liquid, additional radial vents can be provided without impairing the correct overall operation of the ventilation device according to the invention.

As is conventional, the alternator is provided with front and rear bearings, in which the motor shaft is journalled, supporting the main functional elements of the alternator.

According to one advantageous variant, with the aim of reducing the overall bulk of the machine, the blades of the fan or fans penetrate within the plate of a respective bearing which carries the claws or reliefs of the rotor, for example over half the height of the plate so as to leave space for the flow in the ducts, that is to say in the space available under a pole-wheel claw. Hence, a rotor equipped with inter-pole magnets can advantageously likewise be cooled by this type of fan, all the more so as the magnets oppose the cooling of the rotor, the coil of which may nevertheless rise to a temperature of the order of 200° C.

Figure 7:
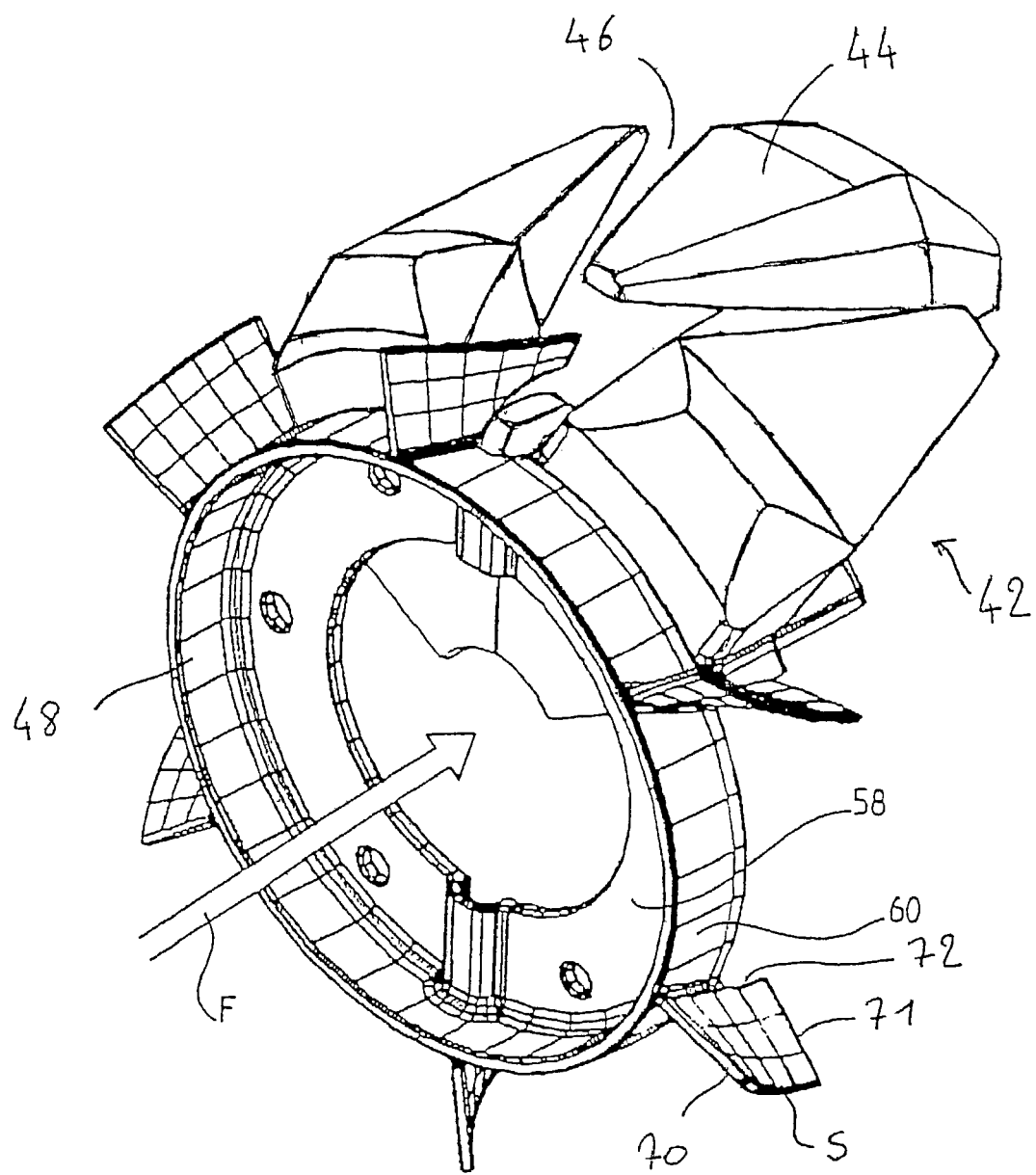
FIG. 7 illustrates yet another embodiment of a fan of a ventilation device in accordance with the invention.

Referring finally to FIG. 7, according to another embodiment, with the aim of increasing the rigidity of the blades, in the region of their base, the fan is provided with a blade support including a first annular part 58 by which it is mounted on the rotor, the part being extended, via its peripheral edge, by a second, generally cylindrical, part 60, externally delimiting a peripheral surface carrying the blades.

The invention claimed is:

1. A Ventilation device for a rotating electrical machine including a rotor (42) provided externally with reliefs (44) delimiting between them channels called cooling channels for the circulation of a cooling fluid and a stator, the rotor (42) is equipped with at least one axial fan (48), fitted with at least one blade (50), suitable for directing an airflow into the cooling channels, the blade (50) forming an angle of incidence (B1, B2) with the direction of the cooling fluid, wherein the angle of incidence (B1, B2) of at least one blade of at least one of the said fan increases from the base of the blade towards the tip (S) of it.

2. The Ventilation device according to claim 1, wherein the chord of at least one blade (50) of at least one of the said fans increases from the base towards the tip thereof.

3. The Ventilation device according to claim 1, wherein the tip (S) of at least one blade of at least one of the said fan is warped in the rotational direction of the fan.

4. The Ventilation device according to claim 1, wherein the base (72) of each blade of the fan is parallel to the rotational axis of the rotor.

5. The Ventilation device according to claim 1, wherein the plane which passes through the cross-section of the base (72) of each blade of the fan forms an angle with the rotational axis of the rotor lying between 0° and 75°.

6. The Ventilation device according to claim 1, wherein the fan (48) is equipped with at least one blade (50) arranged facing each cooling channel (46).

7. The Ventilation device according to claim 6, wherein the fan is provided with two blades (50), for each cooling channel, arranged upstream and downstream respectively.

8. The Ventilation device according to claim 1, wherein at least one blades (50) extends in projection within a support plate for the reliefs (44) of the rotor.

9. The Ventilation device according to claim 1, wherein the blades (50) of the fan are arranged according to an irregular circumferential distribution.

10. The Ventilation device according to claim 1, wherein each blade (50) of at least one of the fans includes a first centrifugal part (52) able to generate a radial airflow and a second axial part (54), able to generate an axial airflow, the first and second parts (52, 54) extending radially internally and radially externally respectively.

11. The Ventilation device according to claim 1, where the tips (S) of the blades of at least one of the fans are joined together by a stiffening ring (56).

12. The Ventilation device according to claim 1, wherein the blades of the fans are mounted on a support including a first annular part (58) providing for fixing of the fan onto the rotor and a second generally cylindrical part (60) extending from said first annual part and carry the blades.

13. A Rotating electrical machine for a motor vehicle comprising, a rotor driven in rotation by a motor shaft and a stator surrounding the rotor disposed in a casing, the rotor and the stator constituting, in one case, an armature and, in the other case, an inductor, and ventilation means able to generate a flow of cooling fluid through the machine, wherein the cooling means include a cooling device according to claim 1, and in that the machine is provided with air intake and exhaust vents extending axially around the cooling means.

14. The Machine according to claim 13, wherein the axial vents are situated facing the blades of the ventilation means.

15. The ventilation device according to claim 1, wherein said at least one blade of said axial fan (48), directs said airflow directly into the cooling channels substantially in an axial direction relative to an axis of rotation of said rotating electrical machine.

16. The ventilation device according to claim 1, wherein the blade includes a warp defined by a longitudinal curvature extending from the base towards the tip in the direction of rotation of the fan along at least one of said leading or trailing edges.

* * * * *